(12) United States Patent
Lee et al.

(10) Patent No.: US 8,783,409 B2
(45) Date of Patent: Jul. 22, 2014

(54) RACK DRIVEN ELECTRIC POWER STEERING APPARATUS

(75) Inventors: Je Ho Lee, Daegu (KR); Nam Hwan Heo, Chuncheon-si (KR)

(73) Assignee: MANDO Corporation, Pyeongtaek-si, Gyeonggi-do (KR)

( * ) Notice: Subject to any disclaimer, the term of this patent is extended or adjusted under 35 U.S.C. 154(b) by 118 days.

(21) Appl. No.: 13/249,938

(22) Filed: Sep. 30, 2011

(65) Prior Publication Data

US 2012/0080257 A1  Apr. 5, 2012

(30) Foreign Application Priority Data

Oct. 4, 2010  (KR) .................. 10-2010-0096286

(51) Int. Cl.
*B62D 5/04*  (2006.01)

(52) U.S. Cl.
USPC ........................... 180/444; 180/443; 180/446

(58) Field of Classification Search
USPC ........................................ 180/444, 443, 446
See application file for complete search history.

(56) References Cited

U.S. PATENT DOCUMENTS

| | | | | |
|---|---|---|---|---|
| 4,067,184 | A * | 1/1978 | Johnson, Jr. ..................... | 57/135 |
| 6,464,034 | B1 * | 10/2002 | Toda et al. ..................... | 180/444 |
| 6,736,235 | B2 * | 5/2004 | Yoshida et al. ............... | 180/444 |
| 7,413,051 | B2 * | 8/2008 | Okada ........................... | 180/444 |
| 2006/0060014 | A1 * | 3/2006 | Namgung .................... | 74/89.23 |
| 2009/0260468 | A1 * | 10/2009 | Tachikake ................. | 74/424.82 |

* cited by examiner

*Primary Examiner* — Joseph M Rocca
*Assistant Examiner* — Marlon Arce
(74) *Attorney, Agent, or Firm* — McDermott Will & Emery LLP (57) ABSTRACT

Disclosed is a rack driven electric power steering apparatus in which balls can be introduced in a state where end caps are assembled within a ball nut, impact noise and friction noise can be reduced when the balls circulate, and a separate assembling device for injection of the balls is not required, making it possible to shorten a manufacturing and assembling process.

12 Claims, 7 Drawing Sheets

RACK DRIVEN ELECTRIC POWER STEERING APPARATUS

CROSS-REFERENCE TO RELATED APPLICATION

This application claims priority from and the benefit under 35 U.S.C. §119(a) of Korean Patent Application No. 10-2010-0096286, filed on Oct. 4, 2010, which is hereby incorporated by reference for all purposes as if fully set forth herein.

BACKGROUND OF THE INVENTION

1. Field of the Invention

The present invention relates to a rack driven electric power steering apparatus, and more particularly to a rack driven electric power steering apparatus which absorbs an impact and vibrations transferred from a road surface to a wheel and a rack bar, absorbs noise generated in the rack bar and a rack housing when the rack bar is slid, making an operation of the electric power steering apparatus smooth, reducing noise, and providing a driver with a comfortable steering feeling.

2. Description of the Prior Art

Although hydraulic power steering apparatuses using a hydraulic pressure of a hydraulic pump have been widely used as power steering apparatuses for a vehicle, electric power steering apparatuses using an electric motor are gradually becoming common recently.

A general electric power steering apparatus includes a steering system extending from a steering wheel to two wheels, and an auxiliary power mechanism for supplying an auxiliary steering power to the steering system.

The auxiliary power mechanism includes a torque sensor configured to detect a steering torque applied to the steering wheel by a driver and output an electric signal proportional to the detected steering torque, an electronic control unit (ECU) configured to generate a control signal based on an electric signal transferred from the torque sensor, a motor configured to generate an auxiliary steering power based on a control signal transferred from the electronic control unit, and a belt type transmission unit configured to transfer an auxiliary power generated in the motor to a rack bar by means of a belt.

Figure 1:
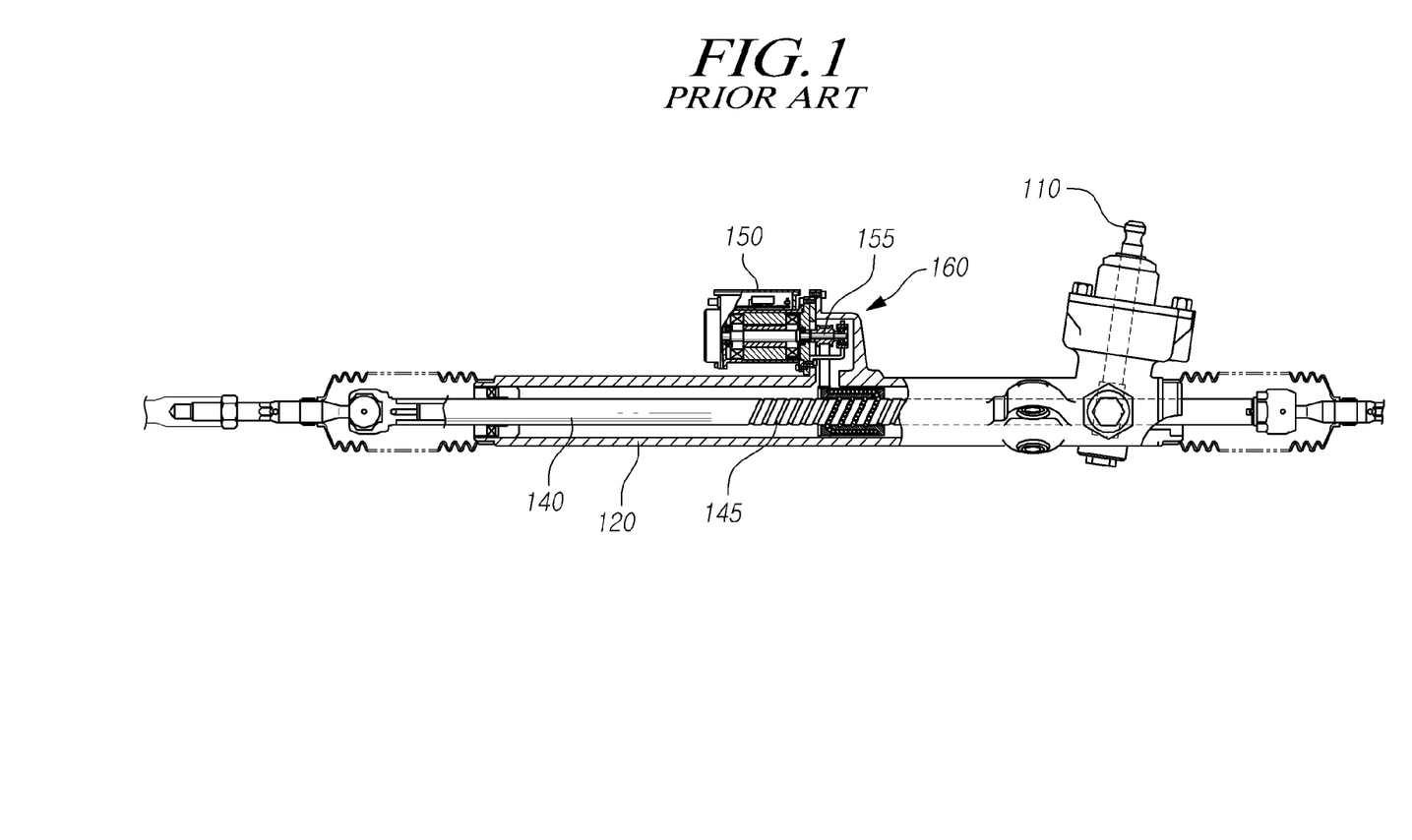
FIG. 1 is a partially sectional view schematically illustrating a conventional rack driven electric power steering apparatus.
Figure 2:
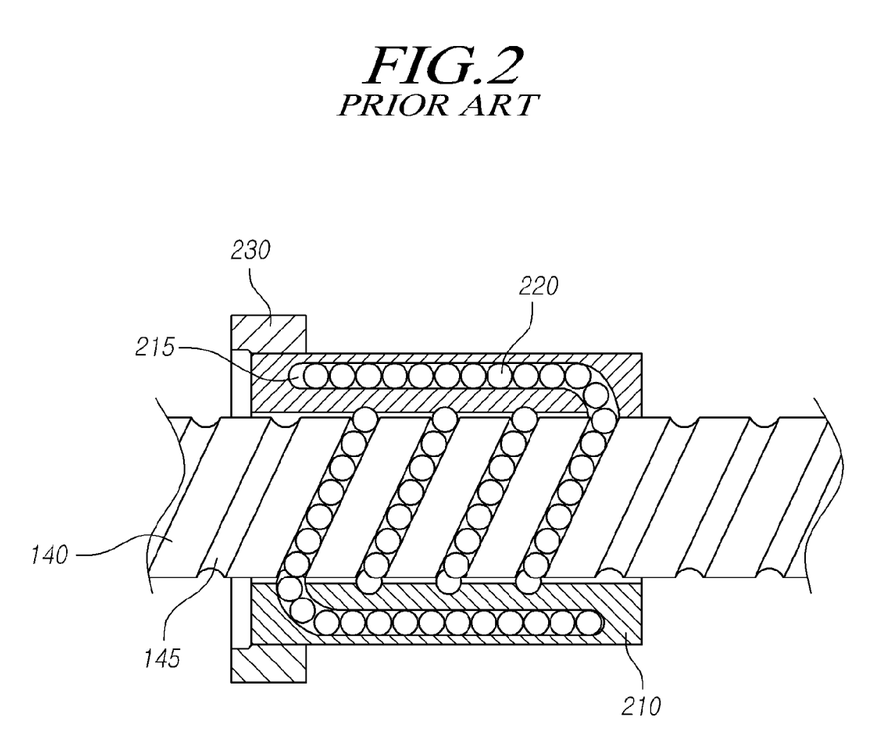
FIG. 2 is a sectional view schematically illustrating a part of the conventional rack driven electric power steering apparatus.

FIG. 1 is a partially sectional view schematically illustrating a conventional rack driven electric power steering apparatus, and FIG. 2 is a sectional view schematically illustrating a part of the conventional rack driven electric power steering apparatus.

As illustrated in FIGS. 1 and 2, the conventional rack driven electric power steering apparatus includes a rack bar 140 extending in a transverse direction of a vehicle and including a rack gear on an outer peripheral surface thereof, a pinion shaft 110 including a pinion gear engaged with the rack gear, a ball nut 210 engaged with an outer screw groove 145 by means of balls, a belt type transmission unit 150 configured to connect the ball nut 210 and a motor shaft 155, and a motor 150.

The pinion shaft 110 is connected to the steering wheel through a steering shaft, and the rack bar 140 having the outer screw groove 145 having a predetermined length on an outer surface thereof is installed within a rack housing 120.

The belt type transmission unit 160 includes a belt connecting the motor shaft 155 and the ball nut 210, and transfers an auxiliary steering power generated in the motor 150 in proportion to a steering torque applied to the steering wheel to the rack bar 140 through the ball nut 210.

The conventional rack driven electric power steering apparatus of FIG. 2 includes a rack bar 140 having an outer screw groove 145 on an outer peripheral surface thereof, a ball nut 210 having an intermediate path 215 along which balls 220 circulate, balls 220 configured to roll while contacting the outer screw groove 145 of the rack bar 140 and the intermediate path 215, and an end cap 230 attached to an end of the ball nut 210.

The rack driven electric power steering apparatus slides the rack bar 140 while the balls 220 roll while contacting the outer screw groove 145 of the rack bar 140 and an inner screw groove of the ball nut 210.

However, according to the conventional rack driven electric power steering apparatus, the end cap is exposed to the outside of the ball nut. Further, impact noise and friction noise increase while the balls are circulating because directions of the balls are converted rapidly. Furthermore, the end cap should be assembled again after the balls are introduced using an assembling device, making the process inefficient.

SUMMARY OF THE INVENTION

Accordingly, the present invention has been made to solve the above-mentioned problems occurring in the prior art, and an aspect of the present invention provides a rack driven electric power steering apparatus in which balls can be introduced in a state where end caps are assembled within a ball nut, impact noise and friction noise can be reduced when the balls circulate, and a separate assembling device for injection of the balls is not required, making it possible to shorten a manufacturing and assembling process.

According to an aspect of the present invention, there is provided a rack driven electric power steering apparatus including: a rack bar having an outer screw groove on an outer peripheral surface thereof; a ball nut having an inner screw groove corresponding to the outer screw groove of the rack bar on an inner peripheral surface thereof to be coupled to the rack bar by means of balls and having a ball circulating passage axially passing through the ball nut between an inner peripheral surface and an outer peripheral surface thereof; a pair of end caps each having a ball introducing passage, one side of which is communicated with the ball circulating passage and an opposite side of which is communicated with the outer screw groove of the rack bar and the inner screw groove of the ball nut, and coupled to opposite inner ends of the ball nut; and a pair of end cap rings coupled to outer sides of the end caps respectively to prevent separation of the balls.

As discussed above, according to the rack driven electric power steering apparatus of the present invention, the balls can be introduced in a state where the end caps are assembled within the ball nut, impact noise and friction noise can be reduced when the balls circulate, and a separate assembling device for injection of the balls is not required, making it possible to shorten the manufacturing and assembling process.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
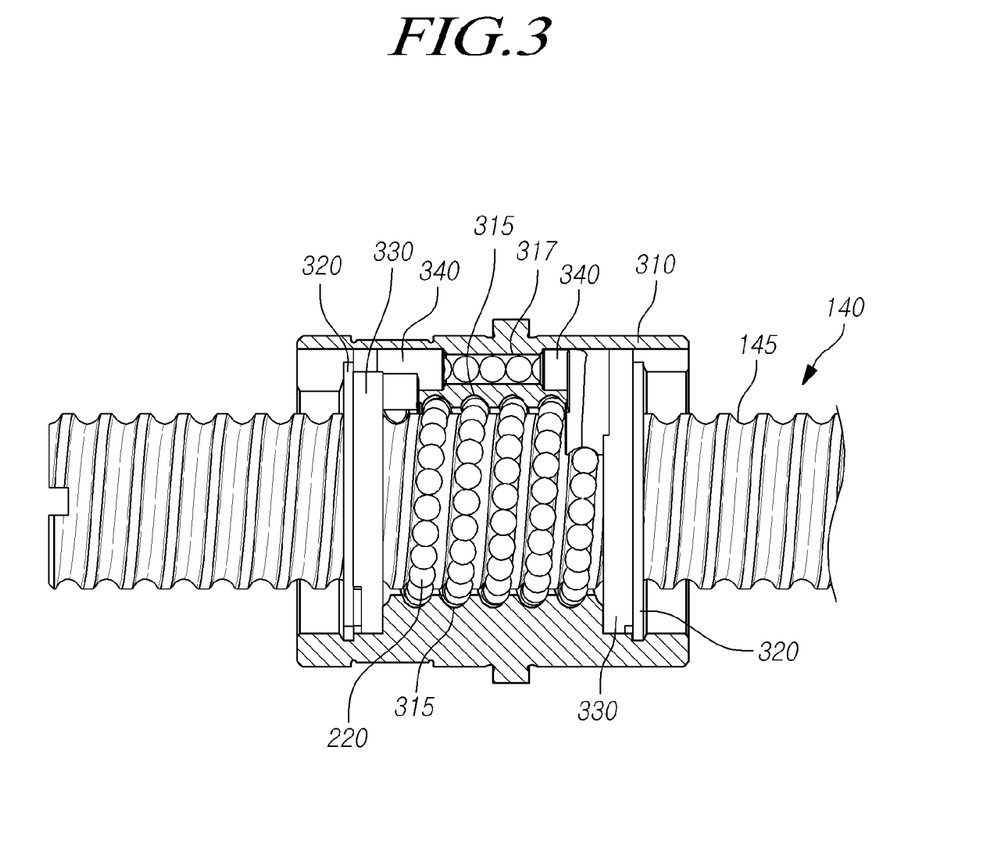
FIG. 3 is a partially sectional view illustrating a part of a rack driven electric power steering apparatus according to an embodiment of the present invention.
Figure 4:
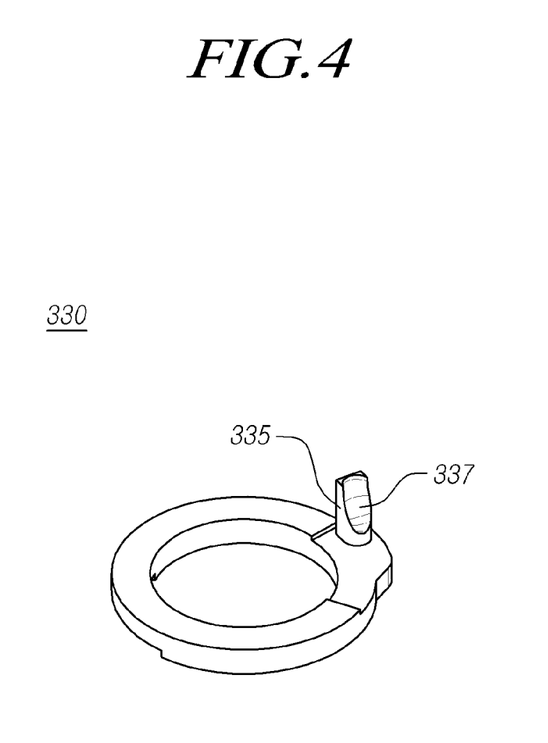
FIG. 4 is a perspective view illustrating an end cap of the rack driven electric power steering apparatus according to the embodiment of the present invention.
Figure 5:
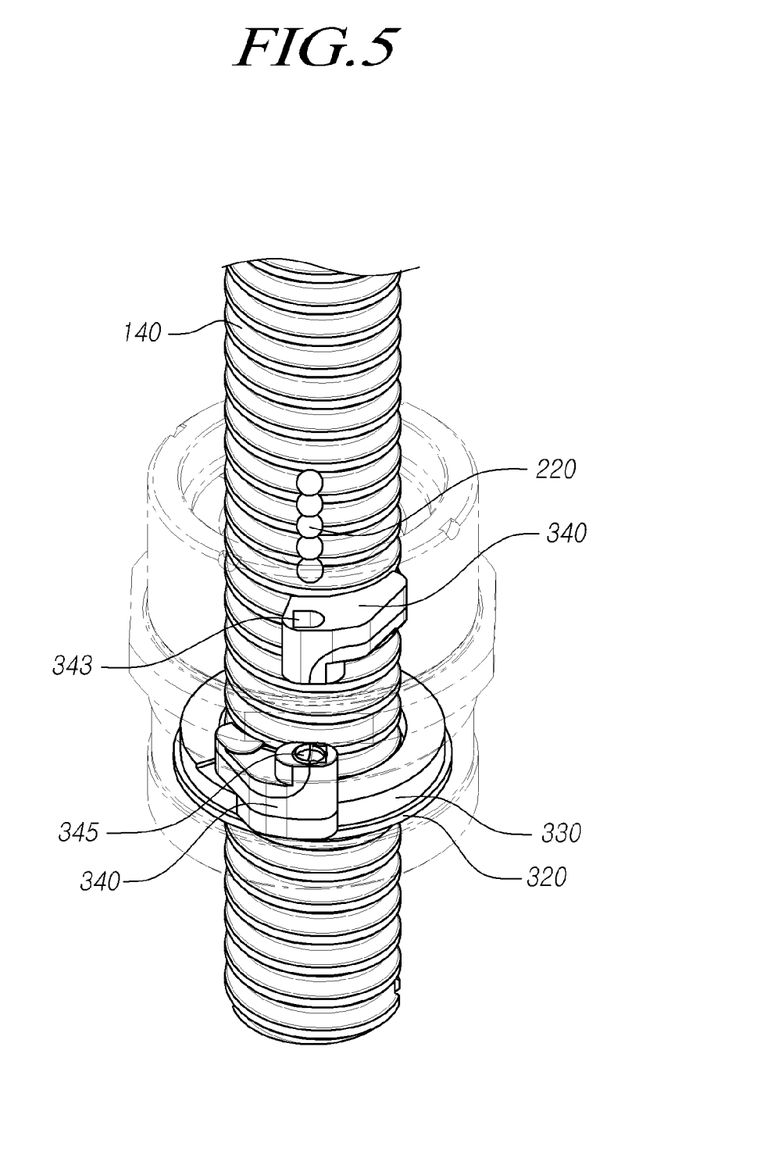
FIG. 5 is a view illustrating an assembled state of a part of the rack driven electric power steering apparatus according to the embodiment of the present invention.
Figure 6:
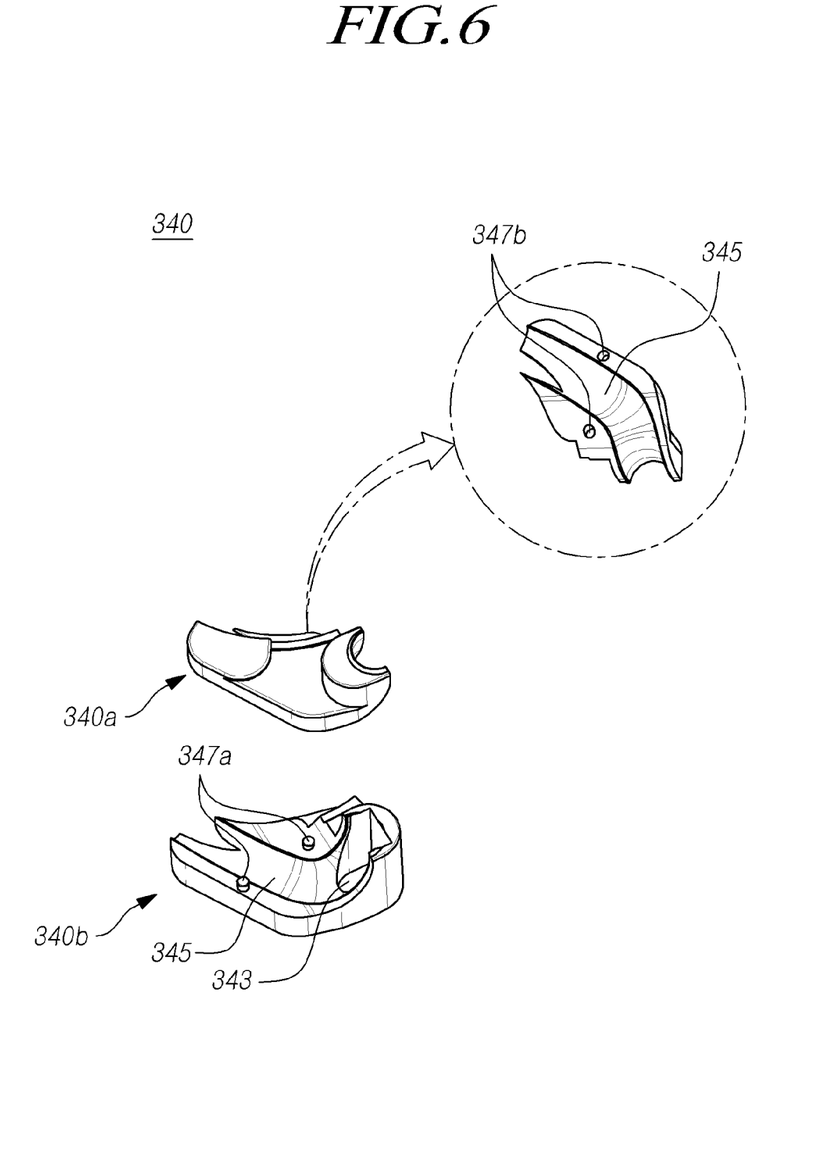
FIG. 6 is an exploded perspective view illustrating the end cap of the rack driven electric power steering apparatus according to the embodiment of the present invention.
Figure 7:
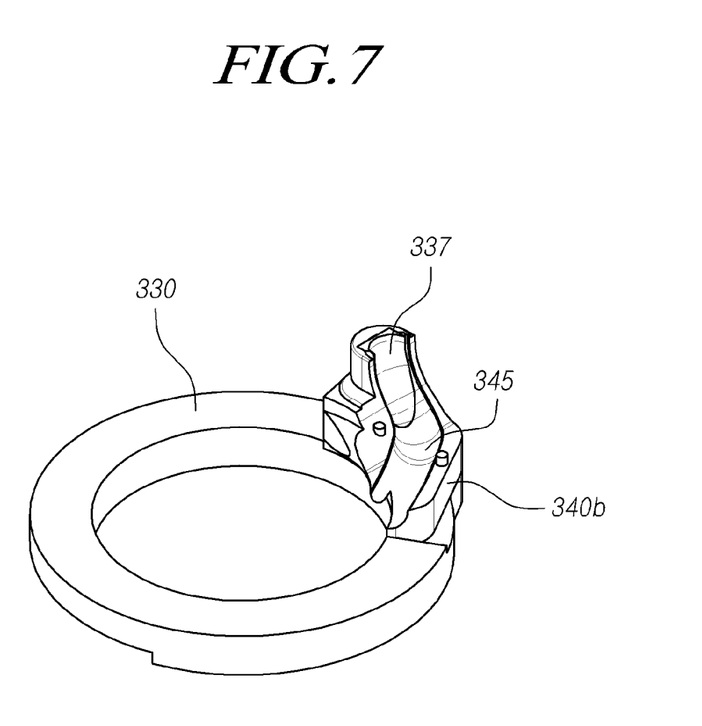
FIG. 7 is a perspective view illustrating a state where an end ring and the end cap of the rack driven electric power steering apparatus according to the embodiment of the present invention are coupled to each other.

FIG. 3 is a partially sectional view illustrating a part of a rack driven electric power steering apparatus according to an embodiment of the present invention. FIG. 4 is a perspective view illustrating an end cap of the rack driven electric power steering apparatus according to the embodiment of the present invention. FIG. 5 is a view illustrating an assembled state of a part of the rack driven electric power steering apparatus according to the embodiment of the present invention. FIG. 6 is an exploded perspective view illustrating the end cap of the rack driven electric power steering apparatus according to the embodiment of the present invention. FIG. 7 is a perspective view illustrating a state where an end ring and the end cap of the rack driven electric power steering apparatus according to the embodiment of the present invention are coupled to each other.

As illustrated in the drawings, the rack driven electric power steering apparatus according to the embodiment of the present invention includes: a rack bar 140 having an outer screw groove 145 on an outer peripheral surface thereof; a ball nut 310 having an inner screw groove 315 corresponding to the outer screw groove 145 of the rack bar 140 on an inner peripheral surface thereof to be coupled to the rack bar 140 by means of balls and having a ball circulating passage 317 axially passing through the ball nut 310 between an inner peripheral surface and an outer peripheral surface thereof; a pair of end caps 340 each having a ball introducing passage 345, one side of which is communicated with the ball circulating passage and an opposite side of which is communicated with the outer screw groove 145 of the rack bar 140 and the inner screw groove 315 of the ball nut 310, and coupled to opposite inner ends of the ball nut 310; and a pair of end cap rings 330 coupled to outer sides of the end caps 340 respectively to prevent separation of the balls 220.

The rack driven electric power steering apparatus is operated by a driving unit and a driven unit. The driving unit includes an electric motor (see 150 of FIG. 1) controlled by an electronic control unit (ECU), a driving pulley (not shown) fixed to a shaft of the electric motor, and a driving belt (not shown) wound on the driving pulley. The driven unit includes a ball nut 310 installed within a rack housing surrounding the rack bar 140 to support the rack bar 140 and a driven pulley (not shown) configured to rotate the ball nut 310.

The driving pulley and the driven pulley of the electric motor are disposed in parallel to each other. The driving belt is wound on the driving pulley and the driven pulley to transfer a rotating force of the electric motor to the ball nut 310 and move the rack bar 140 through an operation of the ball nut 310, generating an auxiliary steering force.

The ball nut 310 is engaged with the rack bar 140 by means of the balls 220 to be rotated by the driving pulley and the driven pulley connected to the driving belt, sliding the rack bar 140 with a rotating force thereof.

A power transmitting structure is provided in the ball nut 310 and the rack bar 140 to axially slide the rack bar 140, generating an auxiliary steering force. The power transmitting structure includes the outer screw groove 145 formed on an outer peripheral surface of the rack bar 140 in a spiral form having a semispherical or semi-elliptical section, the balls 220, and the inner screw groove 315 formed on an inner peripheral surface of the ball nut 310 to correspond to the outer screw groove 145 in a spiral form having a semispherical or semi-elliptical section.

The ball nut 310 engaged with the rack bar 140 by means of the balls 220 is a hollow tube having the inner screw groove 315 on an inner peripheral surface thereof, and the ball circulating passage 317 is formed between the inner peripheral surface and the outer peripheral surface of the ball nut 310 to pass through the ball nut 310 in a central axis direction of the rack bar 140, in which case when the ball nut 310 is rotated to slide the rack bar 140, the balls 220 circulate through the outer and inner screw grooves 145 and 315 of the rack bar 140 and the ball nut 310 and the ball circulating passage 317.

The end caps 340 are coupled to the insides of the ball nut 310 to automatically introduce and circulate the balls 220. The end cap rings 330 are coupled to the end caps 340 outside the end caps 340 to prevent separation of the balls 220. Stoppers 320 are coupled to the outsides of the end cap rings 330 such that the end caps 340 and the end cap rings 330 are fixed inside of the ball nut 310 without being separated.

The end caps 340 are coupled to opposite inner ends of the ball nut 310 through which the balls 220 circulate. Each of the end caps 340 has a ball introducing passage 345 one side of which is communicated with the ball circulating passage 317 and an opposite side of which is communicated with the rack bar 140 and the outer screw groove 145 and the inner screw groove 315 of the ball nut 310. Since each of the end caps 340 has a ball introducing hole 343 passing through the ball introducing passage 345 in a direction where it is communicated with the ball circulating passage 317, the balls 220 may be automatically introduced from the outside after the rack bar 140 is engaged with the ball nut 310.

Each of the end cap rings 330 supporting the end caps 340 and coupled to the end caps 340 at opposite inner ends of the ball nut 310 has a protrusion 335 protruding from one side surface of the end cap ring 330 in a direction of a central axis, and the protrusion 335 is inserted into and coupled to the ball introducing hole 343 of the end cap 340 to be smoothly connected to the ball introducing passage 345, preventing separation of the balls 220 after the balls 220 are introduced.

The protrusion 335 is coupled to the end cap 340 such that an outer end of the protrusion 335 forms the ball circulating passage 317 and an inner end of the protrusion 335 is communicated with the ball introducing passage 345 so that the balls 220 may circulate. A ball positioning recess 337 is formed in the protrusion 335 to have a curved surface.

Thus, after the balls 220 are introduced, the end cap rings 330 are coupled such that the protrusions 335 block the ball introducing hole 343 to prevent separation of the balls 220 and allow circulation of the balls 220 through the ball positioning recesses 337.

Each of the ball positioning recesses 337 has an inner end whose radius of curvature is the same as that of the ball introducing passage 345 and is connected to the ball introducing passage 345 in a tangential direction, whereby the balls 220 can circulate smoothly without generating a catching feeling.

A curvature of a connecting portion of the ball positioning recess 337 and the ball introducing passage 345 is changed not rapidly but smoothly so that when the balls 220 are introduced toward the ball positioning recess 337 and the ball introducing passage 345 from the ball circulating passage 317, they pass smoothly to reduce a catching feeling and noise.

The end cap ring 330 is made of an engineering plastic material so that the balls 220 may contact the ball positioning recess 337 through the ball circulating passage 317 while acting as a damper, making it possible to reduce impact noise.

The end cap 340 may be made of iron or nickel through sintering, or may be made of a metal material or an engineering plastic material. The end cap 340 may be separated into two or more pieces, and includes a coupling unit 347a and 347b on separated surfaces so that they can be coupled even after their separation. FIG. 6 exemplarily illustrates an example of separating the end cap 340 into two pieces.

As illustrated in FIG. 6, the coupling unit for coupling and fixing the end cap 340 which is separated includes coupling bosses 347a protruding at corresponding locations on a separated surface of the end cap 340, and coupling recesses 347b within which the coupling bosses 347a are inserted and coupled.

Meanwhile, the above-mentioned coupling unit is simply illustrative, but the present invention is not limited thereto. That is, the end cap 340 may be assembled through bonding or fusion.

In the mean time, a connecting portion of the ball introducing passage 345 and the outer screw groove 145 of the rack bar 140 has a radius of curvature which is the same as that of the outer screw groove 145 so that the balls 220 may be introduced or circulated without causing a catching feeling.

The ball introducing passage 345 is connected to the outer screw groove 145 and the inner screw groove 315 in a tangential direction and extends in a fork-shaped curved form from a portion where it is communicated with the ball circulating passage 317 of the ball nut 310 to a portion where it is communicated with the outer screw groove 145 and the inner screw groove 315, whereby the balls 220 may smoothly circulate when the balls 220 are introduced after the ball nut 310 and the end cap 340 are assembled.

That is, the ball positioning recess 337 and the ball introducing passage 345 connect the axially formed ball circulating passage 317, and the spirally formed outer and inner screw grooves 145 and 315 so that they form a soft and smooth curved surface.

Thus, as illustrated in FIGS. 3 and 5, if the balls 220 are introduced into the ball introducing passage 345 through the ball introducing hole 343 of the end cap 340 after the rack bar 140 and the ball nut 310 are engaged with each other, and then the end cap 340 is coupled, and before one of the end cap rings 330 is coupled, the balls 220 circulate the ball circulating passage 317 and the outer and inner screw grooves 145 and 315 through the ball introducing passage 345 to be automatically introduced.

The end caps 340 coupled to opposite ends of the ball nut 310 are coupled to locations corresponding to each other to be communicated with the ball circulating passage 317, and the balls 220 are automatically introduced through the ball introducing holes 343 at opposite outer sides of the ball nut 310.

If the balls 220 are completely introduced automatically, the protrusions 335 of the end cap rings 330 are coupled to the ball introducing holes 343 of the end caps 340 and stoppers are coupled to outsides of the end cap rings 330 to finish the assembling process.

As mentioned above, according to the rack driven electric power steering apparatus for a vehicle of the present invention, the balls can be introduced in a state where the end caps are assembled within the ball nut, impact noise and friction noise can be reduced when the balls circulate, and a separate assembling device for injection of the balls is not required, making it possible to shorten the manufacturing and assembling process.

Although it has been described that all the elements constituting the embodiment of the present invention are coupled into one or operated integrally, the present invention is not limited thereto. That is, one or more elements of the embodiment of the present invention may be selectively coupled and operated without departing from the scope of the present invention.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A rack driven electric power steering apparatus comprising:
   a rack bar having an outer screw groove on an outer peripheral surface thereof;
   a ball nut having an inner screw groove corresponding to the outer screw groove of the rack bar on an inner peripheral surface thereof to be coupled to the rack bar by means of balls and having a ball circulating passage axially passing through the ball nut between an inner peripheral surface and an outer peripheral surface thereof;
   a pair of end caps each having a ball introducing passage, one side of which is communicated with the ball circulating passage and an opposite side of which is communicated with the outer screw groove of the rack bar and the inner screw groove of the ball nut, and coupled to opposite inner ends of the ball nut; and
   a pair of end cap rings selectively coupled to outer sides of the end caps respectively to prevent separation of the balls,
   wherein the ball introducing passage of the end cap extends in a fork-shaped curved form from a portion where the ball introducing passage is communicated with the ball circulating passage of the ball nut to a portion where it is communicated with the outer screw groove and the inner screw groove, whereby the balls circulate and are introduced smoothly.

2. The rack driven electric power steering apparatus as claimed in claim 1, further comprising stoppers coupled to inner sides of the ball nut to fix the end cap rings.

3. The rack driven electric power steering apparatus as claimed in claim 1, wherein the ball introducing passage of the end cap has a same radius of curvature as that of the outer screw groove and the inner screw groove at a portion connected to the outer screw groove and the inner screw groove.

4. The rack driven electric power steering apparatus as claimed in claim 1, wherein the ball introducing passage of the end cap is connected to the outer screw groove and the inner screw groove in a tangential direction.

5. The rack driven electric power steering apparatus as claimed in claim 1, wherein the outer side of each end cap includes a ball introducing hole.

6. The rack driven electric power steering apparatus as claimed in claim 5, wherein at least one of the end cap rings is selectively coupled to the outer side of a corresponding end cap via the ball introducing hole of the corresponding end cap.

7. The rack driven electric power steering apparatus as claimed in claim 5, wherein at least one of the end cap rings includes a protrusion disposed in the ball introducing hole of a corresponding end cap.

8. A rack driven electric power steering apparatus comprising:
   a rack bar having an outer screw groove on an outer peripheral surface thereof;
   a ball nut having an inner screw groove corresponding to the outer screw groove of the rack bar on an inner peripheral surface thereof to be coupled to the rack bar by means of balls and having a ball circulating passage axially passing through the ball nut between an inner peripheral surface and an outer peripheral surface thereof;
   a pair of end caps each having a ball introducing passage, one side of which is communicated with the ball circulating passage and an opposite side of which is communicated with the outer screw groove of the rack bar and the inner screw groove of the ball nut, and coupled to opposite inner ends of the ball nut; and
   a pair of end cap rings coupled to outer sides of the end caps respectively to prevent separation of the balls,
   wherein each of the end caps has a ball introducing hole passing through the ball introducing passage in a direction where the ball introducing hole is communicated with the ball circulating passage, and wherein each of the end cap rings has a protrusion protruding axially from one side surface thereof and the protrusion is inserted into and coupled within the ball introducing hole.

9. The rack driven electric power steering apparatus as claimed in claim 8, wherein the protrusion has a ball positioning recess communicated with the ball introducing passage and formed at one end of the protrusion to form a curved surface so that the balls circulate.

10. The rack driven electric power steering apparatus as claimed in claim 9, wherein the ball positioning recess has a same radius of curvature as that of the ball introducing passage and is connected to the ball introducing passage in a tangential direction.

11. A rack driven electric power steering apparatus comprising:
    a rack bar having an outer screw groove on an outer peripheral surface thereof;
    a ball nut having an inner screw groove corresponding to the outer screw groove of the rack bar on an inner peripheral surface thereof to be coupled to the rack bar by means of balls and having a ball circulating passage axially passing through the ball nut between an inner peripheral surface and an outer peripheral surface thereof;
    a pair of end caps each having a ball introducing passage, one side of which is communicated with the ball circulating passage and an opposite side of which is communicated with the outer screw groove of the rack bar and the inner screw groove of the ball nut, and coupled to opposite inner ends of the ball nut; and
    a pair of end cap rings coupled to outer sides of the end caps respectively to prevent separation of the balls,
    wherein each of the end caps includes a coupling unit on separated surfaces thereof so that the end cap is separated into two pieces along the ball introducing passage.

12. The rack driven electric power steering apparatus as claimed in claim 11, wherein the coupling unit has a coupling boss and a coupling recess formed at locations of the separated surfaces of the end cap corresponding to each other.

* * * * *